United States Patent [19]

Gray et al.

[11] Patent Number: 5,019,289

[45] **Date of Patent: * May 28, 1991**

[54] STABLE LIQUID DETERGENT CONTAINING INSOLUBLE OXIDANT

[75] Inventors: Robert L. Gray, Danbury, Conn.; David Peterson; Loren Chen, both of Pleasanton, Calif.; Gregory V. Buskirk, Danville, Calif.

[73] Assignee: The Clorox Company, Oakland, Calif.

[*] Notice: The portion of the term of this patent subsequent to Jan. 2, 2007 has been disclaimed.

[21] Appl. No.: 458,873

[22] Filed: Dec. 29, 1989

Related U.S. Application Data

[63] Continuation-in-part of Ser. No. 276,599, Nov. 25, 1988, Pat. No. 4,891,147.

[51] Int. Cl.[5] .................... C11D 3/395; C11D 7/54; C01B 15/00

[52] U.S. Cl. .................... 252/95; 252/104; 252/103; 252/105; 252/186.27; 252/186.43; 252/DIG. 14

[58] Field of Search .................... 252/95, 104, 103, 105, 252/186.27, 186.43, DIG. 14

[56] References Cited

U.S. PATENT DOCUMENTS

| | | | |
|---|---|---|---|
| 2,288,410 | 6/1942 | Lippman | 252/186 |
| 3,230,171 | 1/1966 | Moyer | 252/95 |
| 3,251,800 | 5/1966 | Moyer | 252/186 |
| 3,259,584 | 7/1966 | Moyer | 252/186 |
| 3,332,882 | 7/1967 | Blumbergs | 252/186 |
| 3,382,182 | 5/1982 | Moyer | 252/186 |
| 3,706,670 | 12/1972 | Gray | 252/95 |
| 3,795,625 | 3/1974 | Kowalski | 252/186.27 |
| 3,852,210 | 12/1974 | Krezanoski | 252/95 |
| 3,970,575 | 7/1976 | Barrett | 252/95 |
| 3,996,151 | 12/1976 | Kirner | 252/99 |
| 4,130,501 | 12/1978 | Lutz | 252/186 |
| 4,306,987 | 12/1981 | Kaneko | 252/99 |
| 4,347,149 | 8/1982 | Smith et al. | 252/102 |
| 4,399,633 | 8/1986 | Haughey | 47/57.6 |
| 4,421,664 | 12/1983 | Anderson et al. | 252/94 |
| 4,430,236 | 2/1984 | Franks | 252/95 |
| 4,470,919 | 9/1984 | Goffinet et al. | 252/102 |
| 4,525,291 | 6/1985 | Smith et al. | 252/193 |
| 4,618,446 | 10/1986 | Haslop et al. | 252/135 |
| 4,620,935 | 11/1986 | Baxter | 252/99 |
| 4,699,623 | 10/1987 | Dubreux et al. | 8/111 |
| 4,784,787 | 11/1988 | Dubreux et al. | 252/99 |
| 4,786,431 | 11/1988 | Broze et al. | 252/99 |
| 4,891,147 | 1/1990 | Gray et al. | 252/104 |

FOREIGN PATENT DOCUMENTS

| | | |
|---|---|---|
| 209228 | 1/1987 | European Pat. Off. . |
| 246985 | 11/1987 | European Pat. Off. . |
| 279282 | 8/1988 | European Pat. Off. . |
| 3534524 | 4/1987 | Fed. Rep. of Germany . |
| 2573452 | 5/1986 | France . |
| 551831 | 3/1943 | United Kingdom . |
| 976511 | 11/1964 | United Kingdom . |
| 1002893 | 9/1965 | United Kingdom . |

OTHER PUBLICATIONS

P. Ekwall, "Composition, Properties and Structures of Liquid and Phases in Systems of Amphiphilic Compounds".

C. Miller et al., "Behavior of Dilute Lamellar Liquid-Crystal and Phases," *Colloids and Surfaces*, vol. 19, pp. 198–223 (1986).

W. J. Benton et al., "Lyotropic Liquid Crystalline Phases. . . ," *J. Physical Chemistry*, vol. 87, pp. 4981–4991 (1983).

*Primary Examiner*—A. Lionel Clingman
*Assistant Examiner*—Kevin McCarthy
*Attorney, Agent, or Firm*—Joel J. Hayashida; Michael J. Mazza; Harry A. Pacini

[57] ABSTRACT

The invention provides a phase stable liquid detergent composition containing at least one insoluble oxidant, comprising:

(a) a liquid phase which comprises: (i) an effective amount of at least one surfactant selected from the group consisting of anionic, nonionic, cationic, amphoteric, zwitterionic surfactants, and mixtures thereof; (ii) a liquid carrier therefor, comprising water soluble or dispersible organic solvents, water, or a mixture thereof;

(b) an effective amount of a water insoluble oxidant stably suspended in said liquid phase, which maintains oxidative stability, said water insoluble oxidant being an alkaline earth metal peroxide or a Group IIB peroxide; and (c) a stabilizer which is either a source of common ions or by buffering to a pH of greater than 8.

20 Claims, No Drawings

STABLE LIQUID DETERGENT CONTAINING INSOLUBLE OXIDANT

This is a continuation-in-part of copending application Ser. No. 07/276,599, filed on Nov. 25, 1988, now U.S. Pat. No. 4,891,147.

BACKGROUND OF THE INVENTION

1. Field of the Invention

This invention relates to phase stable, liquid detergents, which contain essentially insoluble oxidants, which maintain good oxidative stability yet have surprisingly effective performance in fabric bleaching and cleaning.

2. Brief Description of Related Art

Liquid detergents are desirable alternatives to dry, granular detergent products. While dry, granular detergents have found wide consumer acceptance, liquid products can be adapted to a wide variety of uses. For example, liquid products can be directly applied to stains and dirty spots on fabrics, without being predissolved in water or other fluid media. Further, a "stream" of liquid detergent can be more easily directed to a targeted location in the wash water or clothing than a dry, granular product.

There have been many attempts to formulate liquid detergents which contain oxidants.

For example, Krezanoski, U.S. Pat. No. 3,852,210, Lutz et al., U.S. Pat. No. 4,130,501, and Smith et al., U.S. Pat. No. 4,347,149, disclose liquid hydrogen peroxide-based bleach compositions at relatively low pH's containing relatively minor amounts of surfactants. The disadvantage with these compositions would be rather low detergency, owing to the low amount of surfactants.

Franks, U.S. Pat. No. 4,430,236, Goffinet et al., U.S. Pat. No. 4,470,919, and Smith et al., U.S. Pat. No. 4,525,291, disclose higher amounts of hydrogen peroxide and surfactant. However, in order to preserve the oxidant, the compositions generally require the addition of stabilizing agents, such as a lower alcohol and an amino polyphosphonate (Smith et al.) or fatty acids and soluble calcium salts (Goffinet et al.).

Alkaline earth metal oxidants have been proposed in various dry detergent or bleach products, e.g., U.S. Pat. Nos. 3,230,171, 3,251,780, 3,259,584, 3,382,182, all to Moyer; Lippmann, U.S. Pat. No. 2,288,410; Blumbergs, U.S. Pat. No. 3,332,882, and German published patent application DE OS 35 34524.

However, none of the foregoing references, or a combination thereof, teaches, discloses or suggests that alkaline earth metal peroxides may be stably incorporated in a liquid detergent medium. None of the art further teaches that oxidant stability of such insoluble oxidant is maintained or that surprisingly effective cleaning performance is obtained therewith. Finally, none of the art teaches, discloses or suggests that relatively small amounts of an antioxidant are effective at stabilizing liquid detergents containing such insoluble oxidants.

SUMMARY OF THE INVENTION AND OBJECTS

The invention provides a phase stable liquid detergent containing at least one insoluble oxidant, comprising:

(a) a liquid phase which comprises: i) an effective amount of at least one surfactant selected from the group consisting of anionic, nonionic, cationic, amphoteric, zwitterionic surfactants, and mixtures thereof; ii) a liquid carrier therefore, comprising organic solvents, water, or a mixture thereof; and (b) an effective amount of a water insoluble oxidant stably suspended in said liquid phase, which maintains oxidative stability, said water insoluble oxidant being an alkaline earth metal peroxide or a Group IIB peroxide; said detergent composition being buffered to a pH of greater than 8.

In a further embodiment of the invention, is provided a phase stable liquid detergent containing in an oxidant insoluble therein during storage, but which releases active oxygen during use in aqueous wash media, said detergent comprising:

(a) a structured liquid phase which comprises: (i) a mixture of anionic surfactants; a mixture of nonionic surfactants; or a mixture of anionic and nonionic surfactants, in a proportion sufficient to result in a liquid structure capable of dispersing solids insoluble in said liquid phase; and (ii) a fluid carrier therefor which comprises water, a water soluble or dispersible organic solvent, or a mixture thereof; and (b) an effective amount of an essentially insoluble oxidant stably suspended in said liquid phase, which oxidant maintains oxidative stability, said oxidant being an alkaline earth metal peroxide or a Group IIB peroxide; said detergent composition being buffered to a pH of greater than 8.

In a further preferred embodiment of the invention, the means of enhancing the stability of the liquid detergent is a source of common ions, most preferably a soluble calcium salt when the oxidant is calcium peroxide, and a soluble magnesium salt when the oxidant is magnesium peroxide.

Various adjuncts known to those skilled in the art can be included in these liquid detergent compositions.

It is therefore an object of this invention to provide a liquid detergent containing an essentially water insoluble oxidant which has good oxidative stability.

It is a further object of this invention to provide a phase stable liquid detergent in which an insoluble, particulate oxidant is stably suspended or dispersed in the continuous liquid phase comprising surfactants and a liquid carrier therefor.

It is yet another object of this invention to provide a liquid detergent containing an essentially insoluble oxidant suspended therein which has improved stability over detergents containing soluble oxidants.

It is moreover an object of this invention to provide a liquid detergent containing an essentially insoluble oxidant suspended therein which is relatively benign to enzymes, fluorescent whitening agents, and other oxidation sensitive materials.

DETAILED DESCRIPTION OF THE PREFERRED EMBODIMENT

The invention provides a phase stable liquid detergent containing at least one insoluble oxidant stably suspended therein. The advantage of the detergent over existing liquid oxidant detergents is multifold. First, many of the liquid oxidant detergents described in the literature contain relatively small amounts of actives, such as surfactants, fluorescent whitening agents, enzymes, and the like. The reason for this is that such detergent actives are relatively unstable in aqueous liquid oxidant media, such as liquid hydrogen peroxide. In order to circumvent this problem, many references have taught the use of various stabilizers (e.g., Smith et al., U.S. Pat. Nos. 4,347,149 and 4,525,291, and Goffinet et al., U.S. Pat. No. 4,470,919). However, the problem of relatively small amounts of effective detergent actives remains. Next, when liquid oxidant detergents are formulated, it is always problematic to incorporate enzymes, fluorescent whitening agents, or the like in such compositions since they have a tendency to become deactivated in such formulations. In the present invention, by contrast, because the oxidant is essentially insoluble in storage, significantly little active oxygen is generated to attack such oxidation-sensitive adjuncts. Further, as described below, small amounts of anti-oxidants can be incorporated to act as active oxygen "scavengers."

The ingredients of the present liquid detergents are described herein:

1. The Liquid Phase

The liquid phase is a mixture of an effective amount of at least one surfactant combined with a liquid or fluid carrier therefor. The carrier comprises organic solvents, water, or a mixture thereof.

a. Surfactants

The surfactant can be selected from anionic, nonionic, cationic, zwitterionic, amphoteric surfactants, and mixtures thereof. The types and combination of surfactants used depends on the intended end use, i.e., whether greasy soils or particulate soils are targeted for removal, or cost, or clarity, or other attributes.

Particularly effective surfactants appear to be anionic surfactants. Examples of such anionic surfactants may include the ammonium, substituted ammonium (e.g., mono-, di-, and triethanolammonium), alkali metal and alkaline earth metal salts of $C_6$–$C_{20}$ fatty acids and rosin acids, linear and branched alkyl benzene sulfonates, alkyl sulfates, alkyl ether sulfates, alkane sulfonates, olefin sulfonates, hydroxyalkane sulfonates, fatty acid monoglyceride sulfates, alkyl glyceryl ether sulfates, acyl sarcosinates and acyl N-methyltaurides. Preferred are aromatic sulfonated surfactants. Of particular preference are alkyl ether sulfates and linear and branched $C_{6-18}$ alkyl benzene sulfonates, both the salts thereof as well as the acidic form. The anionic surfactant should be present in the liquid detergent at about 0–50%, more preferably 1–40%, and most preferably, 5-35%, by weight of the composition.

The nonionic surfactants present in the invention will preferably have a pour point of less than 40° C., more preferably less than 35° C., and most preferably below about 30° C. They will have an HLB (hydrophile-lipophile balance) of between 2 and 16, more preferably between 4 and 15, and most preferably between 10 and 14. However, mixtures of lower HLB surfactants with higher HLB surfactants can be present, the resulting HLB usually being a weighted average of the two or more surfactants. Additionally, the pour points of the mixtures can be, but are not necessarily, weighted averages of the surfactants used.

The nonionic surfactants are preferably selected from the group consisting of $C_{6-18}$ alcohols with 1–15 moles of ethylene oxide per mole of alcohol, $C_{6-18}$ alcohols with 1–10 moles of propylene oxide per mole of alcohol, $C_{6-18}$ alcohols with 1–15 moles of ethylene oxide and 1–10 moles of propylene oxide per mole of alcohol, $C_{6-18}$ alkylphenols with 1–15 moles of ethylene oxide or propylene oxide or both, and mixtures of any of the foregoing. Certain suitable surfactants are available from Shell Chemical Company under the trademark Neodol. Suitable surfactants include Neodol 25–9 ($C_{6-18}$ alcohols with an average 9 moles of ethylene oxide per mole of alcohol). Another suitable surfactant may be Alfonic 1218–70, which is based on a $C_{12-18}$ alcohol and which is ethoxylated with about 10.7 moles of ethylene oxide per mole of alcohol, from Vista Chemical, Inc. These and other nonionic surfactants used in the invention can be either linear or branched, or primary or secondary alcohols. If surfactants used are partially unsaturated, they can vary from $C_{10-22}$ alkyoxylated alcohols, with a minimum iodine value of at least 40, such as exemplified by Drozd et al., U.S. Pat. No. 4,668,423, incorporated herein by reference. An example of an ethoxylated, propoxylated alcohol is Surfonic JL-80X ($C_{9-11}$ alcohol with about 9 moles of ethylene oxide and 1.5 moles of propylene oxide per mole of alcohol), available from Texaco Chemical Company.

Other suitable nonionic surfactants may include Polyoxyethylene carboxylic acid esters, fatty acid glycerol esters, fatty acid and ethoxylated fatty acid alkanolamides, certain block copolymers of propylene oxide and ethylene oxide and block polymers of propylene oxide and ethylene oxide with a propoxylated ethylene diamine (or some other suitable initiator). Still further, such semi-polar nonionic surfactants as amine oxides, phosphine oxides, sulfoxides and their ethoxylated derivatives, may be suitable for use herein.

Nonionic surfactants are useful in this invention since they are generally found in liquid form, usually contain 100% active content, and are particularly effective at removing oily soils, such as sebum and glycerides.

Suitable cationic surfactants may include the quaternary ammonium compounds in which typically one of the groups linked to the nitrogen atom is a $C_{12}$–$C_{18}$ alkyl group and the other three groups are short chained alkyl groups which may bear substituents such as phenyl groups.

Further, suitable amphoteric and zwitterionic surfactants which contain an anionic water-solubilizing group, a cationic group and a hydrophobic organic group may include amino carboxylic acids and their salts, amino dicarboxylic acids and their salts, alkylbetaines, alkyl aminopropylbetaines, sulfobetaines, alkyl imidazolinium derivatives, certain quaternary ammonium compounds, certain quaternary phosphonium compounds and certain tertiary sulfonium compounds. Other examples of potentially suitable zwitterionic surfactants can be found described in Jones, U.S. Pat. No. 4,005,029, at columns 11–15, which are incorporated herein by reference.

Further examples of anionic, nonionic, cationic and amphoteric surfactants which may be suitable for use in this invention are depicted in Kirk-Othmer, *Encyclopedia of Chemical Technology,* Third Edition, Volume 22, pages 347-387, and *McCutcheon's Detergents and Emulsifiers.* North American Edition, 1983, which are incorporated herein by reference.

It has been, however, found that the most effective liquid phase comprises a mixture of anionic surfactants; or a mixture of anionic and nonionic surfactants, along with the liquid or fluid carrier therefor. The mixture of surfactants is such as to form a structured liquid. It forms a three-dimensional structure which is capable of stably suspending insoluble particulate matter. This structured liquid is not entirely understood, but apparently occurs because of interaction between the surfactants and the electrolytes in the liquid phase. Such interaction is not believed to be a charged-based interaction, but may be due to unique micro-crystalline structures occurring in the liquid phase. See, e.gs., P. Ekwall, "Composition, Properties and Structures of Liquid Crystal and Phases in Systems of Amphiphilic Compounds"; and C. Miller et al., "Behavior of Dilute Lamellar Liquid-Crystal and phases." *Colloids and Surfaces* Vol 19, pp. 197–223 (1986); and W. J. Benton et al., "Lyotropic Liquid Crystalline Phases and Dispersions in Dilute Anionic Surfactant-Alcohol-Brine Systems," *J. Physical Chemistry*. Vol. 87, pp. 4981–4991 (1983), which are incorporated herein by reference. The yield values for these structured liquids should be preferably between about 1–15 Pascals (dyne/$cm^2$), more preferably 2–10 Pascals, as measured on a Bohlin Constant Stress Rheometer.

In the present invention, it is most preferred that the mixture of surfactants comprise either a mixture of anionic surfactants; a mixture of nonionic surfactants; or a mixture of anionic and nonionic surfactants. Where mixtures of anionics are used, they preferably comprise those selected from alkyl ether sulfate, alkyl benzene sulfonate, alkyl sulfates and mixtures thereof. Regarding the latter surfactants, it appears that sulfonated or sulfated anionic surfactants are necessary in order to form the liquid structure to stably suspend the insoluble oxidants. It is especially preferred that the alkyl ether sulfates (also known as alcohol alkoxysulfate anionic surfactants) have the following structure:

$$R—(—OCH_2CH_2—)_nSO_4M$$

Wherein R is a $C_{10-16}$ alkyl, and n is an integer from about 1–10, and M is H or an alkali metal cation (sodium, potassium or lithium. The alkyl benzene sulfonate, on the other hand, is preferably a $C_{6-18}$ alkyl benzene sulfonate. Especially preferred are $C_{9-18}$ alkyl benzene sulfonates, and most especially preferred are $C_{10-14}$ alkyl benzene sulfonates. Exemplary of the alkyl ether sulfates is Neodol 25-3S, from Shell Chemical Company, while an appropriate alkyl benzene sulfonate is Calsoft F-90 (90% active, solid) sodium $C_{11.5}$ alkyl benzene sulfonate, from Pilot Chemical Company. The acidic form of these surfactants, HLAS, may also be appropriate. For example, Bio-Soft S-130 available from Stepan Chemical Company, may also be suitable for use herein. See also the description of acidic surfactants in Choy et al., U.S. Pat. No. 4,759,867 incorporated herein by reference. The alkyl sulfates should be $C_{10-18}$ surfactants, representative of which is sodium lauryl sulfate.

When the combination of surfactants is used, it is preferred that the two major surfactants be in a ratio of about 20:1 to about 1:20, more preferably 10:1 to 1:10, and most preferably 4:1 to 1:4. The resulting liquid composition should preferably have a viscosity of about 1–5,000 milliPascal.seconds (mpaS), more preferably 5–3,000 mPaS, and most preferably about 10–1,500 mPaS. Effective amounts of surfactants are amounts which will result in at least threshold cleaning, and can range from about 0.1–90%.

b. Liquid Carrier

The liquid carrier for the surfactants is water, organic solvents, or a mixture thereof.

Water is the principal fluid medium for carrying the surfactants. Typically, deionized or softened water is used, since it is desirable to avoid large amounts of heavy metals and impurities, such as found in ordinary, hard water.

The organic solvents include lower alkanols, e.g., ethanol, propanol, and possible butanol; glycols (or diols) such as ethylene glycol, and propylene glycol; glycol ethers, such as butyl, ethyl and methyl Cellosolve (Union Carbide) and propylene glycol t-butyl ether (Arcosolve PTB, Arco Chemical Co.); and mixtures thereof.

It is preferable that water comprise a major portion of the liquid carrier, and should, be present in an amount from 5 to 95% by weight of the composition, more preferably 25 to about 90%, and most preferably about 50 to about 85%. The organic solvent may be present in the same amounts, but more preferably, comprises only about 1 to about 50%, more preferably 1 to about 35%, and most preferably about 1 to about 20% of the liquid carrier.

2. Insoluble Oxidant

The insoluble oxidant comprises substantially the major portion of the solid phase suspended in the liquid phase. The insoluble oxidant is preferably selected from alkaline earth metal peroxides and Group IIB peroxides. Most preferably, these are oxidants selected from calcium peroxide, magnesium peroxide, zinc peroxide and mixtures thereof.

Although the previous references have discussed the use of calcium peroxide in dry compositions (e.gs., the Moyer Patents, U.S. Pat. Nos. 3,230,171, 3,251,780, 3,259,584 and 3,382,182), none of the prior references have discussed the use of an insoluble oxidant stably suspended in a liquid matrix. Apparently, prior researchers believed that such insoluble oxidants would be relatively unstable in liquid matrices, see e.g., LipPmann, U.S. Pat. No. 2,288,410.

Applicants have surprisingly determined that insoluble oxidants are especially appropriate for use in liquid detergent compositions. These oxidants are storage stable while suspended in the liquid detergents, yet will have good dispersion and generation of active oxygen when the liquid detergents are charged into laundering solutions, i.e., aqueous wash media. Moreover, because these oxidants are insoluble in the aqueous, liquid phase, they will be relatively benign to oxidation-sensitive additives in the liquid detergents, such as enzymes, fluorescent whitening agents and dyes.

Further, because these essentially insoluble oxidants are relatively insoluble in the liquid phase, they further retain oxidative stability, and therefore provide more active oxygen in the wash liquor than comparable detergents formulated with soluble oxidants, such as liquid hydrogen peroxide.

The essentially insoluble oxidants can be purchased from various manufacturers, e.gs., Interox Chemicals Limited, and FMC. In their commercial form, the oxidants are provided at various active levels, but, typiCally, magnesium peroxide has about 8.5% active oxygen (A.O.), calcium peroxide is usually at around 16.7% A.O., and zinc peroxide is typically at around 9.0% A.O. They are then usually merely added to the liquid phase in order to produce the completed liquid detergents. However, it is preferably that the insoluble oxidant, and other materials comprising the solids portion, have a particle size between 1–50 microns, or preferably between 1–30 microns, and most preferably between 1-25 microns, average particle size. As discussed the materials are usually used "as is," from the supplier, but the desired particle size can also be obtained by using ball mills or grinders.

In another embodiment of the invention, it is preferred to buffer the liquid detergent containing the oxidants to a pH of greater than about 8, more preferably greater than 10, most preferably, greater than about 11. At these high pH's, increased oxidant and surfactant activity is achieved especially with calcium peroxide.

The amount of oxidant to be delivered per use in the wash water is a level of preferably about 0.5 to 100 ppm A.O. per use, and most preferably 1-50 ppm A.O. The effective amount of oxidant in the composition to provide these use levels varies, but can range from 0.1-50% by weight Of the composition.

3. Hydrolase

Enzymes are especially desirable adjunct materials in these liquid detergents. Desirably, in order to maintain optimal activity of these enzymes in these aqueous detergents, it is preferred that an enzyme stabilizer be present. The enzymes used herein are hydrolytic enzymes, or hydrolases, which act by hydrolyzing a given substrate (stain or soil), converting the substrate to a more soluble or easily removed form.

Proteases are one especially preferred class of enzymes. They are selected from acidic, neutral and alkaline proteases. The terms "acidic," "neutral," and "alkaline," refer to the pH at which the enzymes' activity are optimal. Examples of neutral proteases include Milezyme (available from Miles Laboratory) and trypsin, a naturally occurring protease. Alkaline proteases are available from a wide variety of sources, and are typically produced from various microorganisms (e.g., *Bacillis subtilisin*). Typical examples of alkaline proteases include Maxatase and Maxacal from International Biosynthetics, Alcalase, Savinase and Esperase, all available from Novo Industri A/S. See also Stanislowski et al., U.S. Pat. No. 4,511,490, incorporated herein by reference.

Further suitable enzymes are amylases, which are carbohydrate-hydrolyzing enzymes. It is also preferred to include mixtures of amylases and proteases. Suitable amylases include Rapidase, from Société Rapidase, Termamyl from Novo Industri A/S, Milezyme from Miles Laboratory, and Maxamyl from International BioSynthetics.

Still other suitable enzymes are cellulases, such as those described in Tai, U.S. Pat. No. 4,479,881, Murata et al., U.S. Pat. No. 4,443,355, Barbesgaard et al., U.S. Pat. No. 4,435,307, and Ohya et al., U.S. Pat. No. 3,983,082, incorporated herein by reference.

Yet other suitable enzYmes are lipases, such as those described in Silver, U.S. Pat. No. 3,950,277, and Thom et al., U.S. Pat. No. 4,707,291, incorporated herein by reference.

The hydrolytic enzyme should be present in an amount of about 0.01-5%, more preferably about 0.01-3%, and most preferably about 0.1-2% by weight of the detergent. Mixtures of any of the foregoing hydrolases are desirable, especially protease/amylase blends.

4. Anti-Oxidant

It is especially preferred to include discrete amounts of an anti-oxidant in these liquid compositions. Although not entirely understood, Applicants believe, without being bound by theory, that the anti-oxidants aid in the chemical stability as follows:

The anti-oxidant acts to "scavenge" minor amounts of hydrogen peroxide or hydroperoxide species present in the liquid phase, probably generated from the insoluble oxidant. By reacting with the hydroperoxide, the anti-oxidant prevents such oxidant from destabilizing the enzymes present in the liquid detergent.

Suitable anti-oxidants are, without limitation, alkali metal thiosulfates, alkali metal sulfites, alkali metal bisulfites, and mixtures thereof. Ammonium salts of these actives are possible. Ascorbic acid is another potentially suitable candidate. Especially preferred are sodium thiosulfate, sodium sulfite and sodium bisulfite. See also, Anderson et al., U.S. Pat. No. 4,421,664, column 6, lines 25-44, and Gray, U.S. Pat. No. 3,706,670, column 4, lines 12-23, which are incorporated herein by reference thereto. Further anti-oxidants, such as hindered Phenols (BHT, BHA) or substituted hydroxybenzenes can also be of utility in these compositions. Examples of these anti-oxidants are found in U.S. patent application Ser. No. 07/144,616, filed Jan. 11, 1988, by James D. Mitchell et al., of common assignment, which application is incorporated herein by reference thereto.

It is preferred that 0.1-5% by weight of the detergent comprise this anti-oxidant, more preferably, 0.2-5%, and most preferably 0.3-3%. When the anti-oxidant is a hindered phenol or substituted hydroxybenzene, the lower limit thereof can be as low as 0.005%. It is very surprising that such low amounts of anti-oxidant help to dramatically stabilize enzymes against oxidative decomposition, or denaturation.

5. Adjuncts

The standard detergent adjuncts can be included in the present invention. These include dyes, such as Monastral blue and anthraquinone dyes (such as those described in Zielske, U.S. Pat. No. 4,661,293, and U.S. Pat. No. 4,746,461). Pigments, which are also suitable colorants, can be selected, without limitation, from titanium dioxide, ultramarine blue (see also, Chang et al., U.S. Pat. No. 4,708,816), and colored aluminosilicates. Fluorescent whitening agents are still other desirable adjuncts. These include the stilbene, styrene, and naphthalene derivatives, which upon being impinged by ultraviolet light, emit or fluoresce light in the visible wavelength. These FWA's or brighteners are useful for improving the appearance of fabrics which have become dingy through repeated soilings and washings. Preferred FWA's are Phorwite BBH, RKH and BHC, from Mobay Chemicals, and Tinopal 5BMX-C, CBS-X and RBS, from Ciba-Geigy A.G. Examples of suitable FWA's can be found in U.S. Pat. Nos. 1,298,577, 2,076,011, 2,026,054, 2,026,566, 1,393,042; and U.S. Pat. Nos. 3,951,960, 4,298,290, 3,993,659, 3,980,713 and 3,627,758, incorporated herein by reference. Enzyme stabilizers such as soluble alkali metal and alkaline earth salts of chlorides, hydroxides, acetates, formates, or propionates; boric acid; borax; Potentially discrete amounts of ethylene or propylene glycol; an alkanolamine (mono-, di- and triethanolamine); or glycerol, are suitable adjuncts. If the glycol ether is the stabilizer, it is separate from any glycol ether used as the liquid carrier. Anti-redeposition agents, such as carboxymethylcellulose, are potentially desirable. Chelating agents, such as citric acid, ethylenediaminetetraacetic acid, nitrilotriacetic acid, aminopolyphosphonic acid, polyphosphonic acid, or their salts, may be acceptable for use, although inorganic builders themselves are not preferred. The chelating agents chelate heavy metal ions, and should be resistant to hydrolysis and rapid oxidation by oxidants. Preferably, it should have an acid dissociation constant ($pK_a$) of about 1-9, indicating that it dissociates at low pH's to enhance binding to metal cations. Effective amounts of the chelating agent may be from 1-1,000 ppm, more preferably 5-500, most preferably 10-100 ppm in the wash liquor into which the liquid detergent is introduced. Next, foam boosters, such as appropriate anionic surfactants, may be appropriate for inclusion herein. Also, in the case of excess foaming resulting from the use of certain nonionic surfactants, further anti-foaming agents, such as alkylated polysiloxanes, e.g., dimethylpolysiloxane, would be desirable. Next, compatible bleach activators could well be very desirable for inclusion herein and a liquid oxidant, specifically hydrogen peroxide. Suitable examples of appropriate bleach activators may be found in Mitchell et al., U.S. Pat. No. 4,772,290. Mitchell may be especially appropriate since it describes stable activators in an aqueous liquid hydrogen peroxide composition and it is incorporated herein by reference. However, since the insoluble oxidants will not apparently provide large amounts of free hydroperoxide in solution, it may be acceptable to add other activators such as those enumerated in Zielske, EP 267,047 (incorporated herein by reference), which are alkanoyl-oxynitrogen or alkyloxyacetyl, oxynitrogen compounds. Also, it has been found that soluble magnesium (e.gs., $MgCl_2$, $Mg(OH)_2$) and calcium salts additionally act as oxidant stabilizers at levels around 1-15% by weight, when magnesium or calcium peroxide is the oxidant. These are levels which are much higher than when these soluble magnesium and calcium salts are used as enzyme stabilizers (low ppm levels, e.g., 10-100 ppm). The reason for this stabilization is not entirely understood, but is referred to as "common ion" stabilization due to the matching of soluble calcium and magnesium salts with the corresponding calcium and magnesium peroxides. Lastly, in case the composition is too thin, some thickeners such as gums (xanthan gum and guar gum) and various resins (e.g., polyvinyl alCohol and polyvinyl pyrrolidone) may be suitable for use. Fragrances are also desirable adjuncts in these compositions.

The additives may be present in amounts ranging from 0-30%, more preferably 0-20%, and most preferably 0-10%. In certain cases, some of the individual adjuncts may overlap in other categories. For example, some buffers, such as silicates may be also builders. Also, some surface active esters may actually function to a limited extent as surfactants. However, the present invention contemplates each of the adjuncts as providing discrete performance benefits in their various categories.

The Experimental section below further describes and embodies the advantages of these novel liquid detergent compositions.

EXPERIMENTAL

In the following first set of experiments, the oxidative stability of insoluble oxidants was compared against that of hydrogen peroxide. It was demonstrated that dramatically improved stability of such oxidants was achieved versus hydrogen peroxide.

In the following experiments, the liquid detergent base in which the oxidants were tested was a commercial liquid detergent from a leading detergent manufacturer. The analysis of this detergent is believed to be as follows:

TABLE I

Liquid Detergent Analysis

| Ingredient | Wt. % |
|---|---|
| Nonionic Surfactant | 22.8% |
| Na alkyl sulfate[1]/NaAEOS[2]: | 9.5% |
| Sodium formate[3]: | 1.7% |
| Trisodium citrate[4]: | 0.15% |
| Fluorescent Whitening Agent: | 0.2% |
| Amylase: | 0.78% |
| Protease: | 0.81% |
| Ethanol: | 7.0% |
| Propylene Glycol: | 0.4% |
| Water: | to balance |

[1]Sodium dodecyl sulfate, anionic surfactant.
[2]Sodium alkyl ether sulfate, $C_{12}$ alcohol, about 3 moles of ethylene oxide.
[3]Enzyme stabilizer (assumed)
[4]Chelating Agent/builder

TABLE II

Comparison of Oxidant Stability

| | | | 2 weeks at 120° F. | | 4 weeks at 120° F. | |
|---|---|---|---|---|---|---|
| Example | Oxidant | Initial pH | pH | % A.O. Lost | pH | % A.O. Lost |
| 1 | Calcium peroxide[1] | 12.5 | 12.6 | 14% | 12.8 | 29% |
| 2 | Magnesium peroxide[2] | 10.7 | 10.7 | 28% | 10.9 | 33% |
| 3 | Hydrogen Peroxide[3] | 9.0 | 7.2 | 22% | — | — |
| 4 | Hydrogen Peroxide[3] | 12.5[4] | — | 100%, 1 day | — | — |
| 5 | Comparison[3,5] | 9.1 | 8.3 | 25% | 8.3 | 56% |

[1]Oxidant level was 2.9% active.
[2]Oxidant level was 2.18% active.
[3]Oxidant level was 1.33% active.
[4]pH was adjusted upwards to 12.5 buffer.
[5]Comparison was made with the system proposed by Goffinet et al., U.S. Pat. No. 4,470,919.

As can be seen from review of the foregoing oxidant stability for the insoluble oxidants (e.gs., 1 and 2) was better at long term storage; and for calcium peroxide, dramatically superior against the same detergent system containing hydrogen peroxide. Even more significantly, at a high pH (12.5), the inventive system proved greatly superior to a liquid hydrogen peroxide-based system (cf. eg. 1 vs. eg. 4). It should be noted that in eg. 3, hydrogen peroxide was found to induce a drop in formula pH of the system, indicating chemical instability.

In the experiments below, a further embodiment of the invention was tested which had both physical stability (stable suspension/dispersion of solids) and stabilized enzymes against decomposition/deactivation by the use of antioxidants.

TABLE III

Phase Stable Compositions

| | A | B |
|---|---|---|
| NaAEOS, as 100% active: | 12.0% | 12.0% |
| NaLAS, as 100% active: | 3.0% | 3.0% |
| Sodium chloride: | 15.0% | 15.0% |
| Boric Acid | 1.0% | 1.0% |
| Glycerol | 2.0% | 2.0% |
| Borax · 5 $H_2O$ | 10.0% | 10.0% |
| Calcium chloride | 0.1% | 0.1% |
| Enzyme (amylase/protease) | 0.8% | 0.8% |
| Zinc Peroxide (55% active) | 4.0% | 4.0% |
| Sodium sulfite | 0.5% | — |
| Tinopal 5 BMX-C | 0.4% | 0.4% |
| Water | to balance | to balance |

TABLE III-continued

| | Phase Stable Compositions | |
|---|---|---|
| | A | B |
| pH | 8.0 | 8.25 |

TABLE IV

| | Physical Stability (38° C.) | |
|---|---|---|
| | 1 week | 3 weeks |
| A | phase stable[1] | phase stable[1] |
| B | phase stable[1] | phase stable[1] |

[1]phase stable = less than 1% separation of solid from liquid phase.

TABLE V

| | Enzyme Stability | | | |
|---|---|---|---|---|
| | Enzyme Stability at 38° C. | | Oxidant Stability at 38° C. | |
| Formula | 1 week | 3 weeks | 1 week | 3 weeks |
| A | 100% | 100% | 100% | 86% |
| B | 64% | 11% | 100% | 99% |

From the foregoing, it is apparent that a structured liquid comprising a mixture of anionic surfactants is desirable to stably suspend the particulate insoluble oxidant. If the liquid is too thin or unstructured, the solid phase may settle out.

Additionally, the use of discrete amounts of reducing agents/anti-oxidants dramatically improves enzyme stability in the liquid detergents containing essentially insoluble oxidants.

As comparative examples, the base formulations of A and B above were prepared with 2.2% of a 35% hydrogen peroxide solution as the oxidant. These experiments are to test the oxidant stability of hydrogen peroxide in a highly buffered system, and the enzyme stability therein.

TABLE VI

| Oxidant, Enzyme Stabilities of Comparative Formulations with Hydrogen Peroxide | | | | | |
|---|---|---|---|---|---|
| | | Initial pH | pH | AO Remaining[1] | Enzyme |
| Composition C | | | | | |
| Hydrogen Peroxide (35%) | 2.2% | 7.13 | 7.52 | 46% | none |
| Composition D | | | | | |
| Hydrogen Peroxide (35%) | 2.2% | 7.21 | 7.66 | 54% | none |
| Na Sulfite | 0.5% | | | | |

[1]1 week storage at 38° C.

As can be seen from the foregoing, hydrogen peroxide in highly buffered systems suffer from significant oxidant loss, and is deleterious to enzymes. Thus, the invention (as seen in Tables II and V) has surprisingly dramatic oxidant and enzyme stability even in highly buffered systems.

The invention is further illustrated and embodied by the claims which follow below. However, such claims do not restrict or limit the invention and obvious improvements and equivalents and alternatives, which do not depart from the spirit and scope of the invention are captured thereby.

We claim:

1. A phase stable liquid detergent composition containing at least one insoluble oxidant, comprising:

(a) a liquid phase which comprises: (i) an effective amount of at least one surfactant selected from the group consisting of anionic, nonionic, cationic, amphoteric, zwitterionic surfactants, and mixtures thereof; (ii) a liquid carrier therefor, comprising organic water soluble or dispersible solvents, water, or a mixture thereof; and (b) an effective amount of a water insoluble oxidant stably suspended in said liquid phase, which maintains oxidative stability, said water insoluble oxidant being an alkaline earth metal peroxide or a Group IIB peroxide; said detergent composition being buffered to a pH of greater than 8.

2. The composition of claim 1 wherein said oxidant is selected from the group consisting of calcium peroxide, magnesium peroxide, zinc peroxide, and mixtures thereof.

3. The composition of claim 2 wherein the oxidant is calcium peroxide.

4. The composition of claim 2 wherein the oxidant is magnesium peroxide.

5. The composition of claim 2 wherein the oxidant is zinc peroxide.

6. The composition of claim 1 wherein said composition is further buffered to a pH of greater than 10.

7. The composition of claim 1 further comprising c) at least one adjunct from anti-oxidants, enzymes, enzyme stabilizers, dyes, pigments, fluorescent whitening agents, anti-redeposition agents, foam boosters, anti-foaming agents, chelating agents, bleach activators, oxidant stabilizers, thickeners, fragrances, and mixtures thereof.

8. The composition of claim 1 wherein said adjunct of (c) is an oxidant stabilizer and which further is a soluble calcium or magnesium salt, and the corresponding oxidant is calcium or magnesium peroxide.

9. The composition of claim 8 wherein said stabilizer is present at levels of about 1-15% by weight.

10. The composition of claim 8 wherein magnesium peroxide is the oxidant, and the stabilizer is magnesium chloride or magnesium hydroxide.

11. The liquid detergent of claim 7 wherein the proportions of the components are (a) 0.1-90% of (i), 1-99% of (ii); (b) 0.1-5%; (c) 0-30%.

12. A phase stable liquid detergent composition containing at least one insoluble oxidant, comprising:

(a) a liquid phase which comprised: (i) an effective amount of at least one surfactant selected from the group consisting of anionic, nonionic, cationic, amphoteric, zwitterionic surfactants, and mixtures thereof; (ii) a liquid carrier thereof, comprising water soluble or dispersible organic solvents, water, or a mixture thereof;

(b) an effective amount of an insoluble oxidant stably suspended in said liquid phase, which maintains oxidative stability, said water insoluble oxidant being calcium or magnesium peroxide; and (c) a common ion oxidant stabilizer which is a water soluble calcium or magnesium salt.

13. The composition of claim 12 wherein the oxidant is calcium peroxide and the stabilizer is a water soluble calcium salt.

14. The composition of claim 12 wherein the oxidant is magnesium peroxide and the stabilizer is magnesium chloride or magnesium hydroxide.

15. The composition of claim 12 wherein said stabilizer is present at levels of about 1-15% by weight.

16. A phase stable liquid detergent containing an oxidant insoluble therein during storage, but which released active oxygen during use in aqueous wash media, said detergent comprising:

(a) a structured liquid phase which comprises (i) a mixture of anionic surfactants; or an anionic and a nonionic surfactant; and (ii) a fluid carrier therefor which comPrises water, a water soluble or dispersible organic solvent, or a mixture thereof; and (b) an effective amount of an insoluble oxidant stably suspended in said liquid phase, which oxidant maintains oxidative stability, said oxidant being a alkaline earth metal peroxide or a Group IIB peroxide; said detergent composition being buffered to a pH greater than 8.

17. The liquid detergent of claim 16 wherein said liquid phase has a yield value of about 1-15 pascals.

18. The liquid detergent of claim 16 wherein the component (i) is a mixture of anionic surfactants selected from sulfonated and sulfated anionic surfactants.

19. The liquid detergent of claim 18 wherein the anionic surfactant comprises a mixture of an alkyl benzene sulfonate and an alkyl ethoxylated sulfate.

20. The liquid detergent of claim 16 further comprising (c) at least one adjunct from anti-oxidants, enzymes, enzyme stabilizers, dyes, pigments, fluorescent whitening agents, anti-redeposition agents, foam boosters, antifoaming agents, chelating agents, bleach activators, oxidant stabilizers, thickeners, fragrances, and mixtures thereof.

* * * * *